(12) United States Patent
Yasui (10) Patent No.: US 10,193,349 B2
(45) Date of Patent: Jan. 29, 2019

(54) DISTRIBUTION SYSTEM

(71) Applicant: NABTESCO CORPORATION, Tokyo (JP)

(72) Inventor: Tsutomu Yasui, Gifu (JP)

(73) Assignee: NABTESCO CORPORATION, Tokyo (JP)

( * ) Notice: Subject to any disclaimer, the term of this patent is extended or adjusted under 35 U.S.C. 154(b) by 181 days.

(21) Appl. No.: 14/532,674

(22) Filed: Nov. 4, 2014

(65) Prior Publication Data

US 2015/0123467 A1 May 7, 2015

(30) Foreign Application Priority Data

Nov. 5, 2013 (JP) .................................. 2013-229626

(51) Int. Cl.
*H02J 4/00* (2006.01)

(52) U.S. Cl.
CPC ............ *H02J 4/00* (2013.01); *B64D 2221/00* (2013.01)

(58) Field of Classification Search
CPC ....... Y02T 10/7005; B60R 16/03; B60L 11/14
USPC .......................................................... 307/9.1
See application file for complete search history.

(56) References Cited

U.S. PATENT DOCUMENTS

| | | | |
|---|---|---|---|
| 4,575,027 A * | 3/1986 | Cronin .................... | B64C 13/42 244/213 |
| 5,939,800 A * | 8/1999 | Artinian ................. | B64D 13/06 244/53 R |
| 6,664,656 B2 | 12/2003 | Bernier | |
| 2007/0112480 A1* | 5/2007 | Smith ..................... | B64D 15/14 701/10 |
| 2008/0174177 A1* | 7/2008 | Langlois ................... | H02J 1/08 307/9.1 |
| 2009/0157234 A1* | 6/2009 | Breit ....................... | B64C 13/50 701/3 |
| 2009/0295551 A1 | 12/2009 | Dickey | |
| 2009/0302153 A1* | 12/2009 | Matasso ................. | B64C 13/50 244/99.2 |
| 2010/0091422 A1* | 4/2010 | Feng ..................... | H02K 11/02 361/117 |
| 2010/0156171 A1 | 6/2010 | Sechrist | |
| 2011/0181219 A1* | 7/2011 | Liegeois ................. | H02M 7/49 318/400.29 |

(Continued)

FOREIGN PATENT DOCUMENTS

| | | |
|---|---|---|
| JP | 2007-46790 A | 2/2007 |
| JP | 2012-503574 A | 2/2012 |
| JP | 2012-062050 A | 3/2012 |

OTHER PUBLICATIONS

Preissuance Submission by Third Party as issued in Japanese Patent Application No. 2013-229626, dated Nov. 1, 2016.

(Continued)

*Primary Examiner* — Alfonso Perez Borroto
(74) *Attorney, Agent, or Firm* — Pillsbury Winthrop Shaw Pittman, LLP (57) ABSTRACT

Provided is a power system 1 including a central distributor 3, to which power is supplied from a power generator 2 of an aircraft 100, and a distal distributor 5. The distal distributor 5 is away from the central distributor 3 in the aircraft 100, so that the distal distributor 5 receives a power supply from the central distributor 3, the distal distributor 5 distributing the supplied power to electric actuators 15 and a wing illuminator 18.

14 Claims, 8 Drawing Sheets

(56) References Cited

U.S. PATENT DOCUMENTS

| | | |
|---|---|---|
| 2012/0086266 A1 | 4/2012 | Shipley et al. |
| 2012/0104160 A1 | 5/2012 | Baumann |
| 2012/0181857 A1 | 7/2012 | Sechrist |
| 2012/0245794 A1* | 9/2012 | Aragai ............... H02J 1/14 701/36 |
| 2016/0167606 A1 | 6/2016 | Sechrist |

OTHER PUBLICATIONS

Notification of Reasons for Refusal as issued in Japanese Patent Application No. 2013-229626, dated May 9, 2017.

* cited by examiner

DISTRIBUTION SYSTEM

TECHNICAL FIELD

The present invention relates to a distribution system.

BACKGROUND ART

An aircraft has wings. A flight of the aircraft is controlled by operating the wings (e.g. JP 2007-46790 A). Movable wings as one type of the abovementioned wings include primary control surfaces, which are constituted as rudder surfaces such as auxiliary wings (ailerons), rudders and elevators, and secondary control surfaces, which are constituted as flaps, spoilers and alike. These movable wings are operated by using actuators. In addition to the aforementioned devices, the aircraft has legs such as landing gear (a mechanism configured to support a body of the aircraft on the ground), for example.

The movable wings and legs are operated by hydraulics. More specifically, hydraulic circuits are situated in the aircraft. Hydraulic oil is supplied from the hydraulic circuits to actuators. For example, the actuators may be hydraulic cylinders. The actuators are coupled to the aforementioned movable wings or legs. The aforementioned movable wings or legs are operated in response to displacement of pistons of the hydraulic cylinders.

An electric actuator is also known as an actuator which drives a movable wing. For example, the electric actuator may have a screw mechanism. A rod of the screw mechanism is displaced by a drive force from an electric motor. The movable wing is displaced in response to displacement of the rod.

The electric actuator operates under electric power supply from a central distributor which is provided in the aircraft. For instance, the central distributor may be situated in a fuselage of the aircraft. Electric actuators are situated in main wings and a tail wing of the aircraft. A different wire is used for each of the electric actuators to be connected to the central distributor. Therefore, it is necessary to arrange a wire connected to the central distributor for each electric actuator. Accordingly, the aircraft requires long wires.

The aircraft includes electrical devices other than the electric actuators. Therefore, wire arrangement connecting the central distributor to every electrical device makes a total length of the wires in the aircraft very long. This results in a large weight of the aircraft.

SUMMARY OF INVENTION

The present invention has been developed in light of the aforementioned circumstances to provide a distribution system capable of reducing a weight ratio of wires to an aircraft.

The distribution system according to one aspect of the present invention includes a central distributor which is situated in the aircraft; and a distal distributor which is away from the central distributor in the aircraft so that the power is supplied from the central distributor, the distal distributor distributing the supplied power to electrical devices situated in the aircraft.

The aforementioned aircraft distribution system contributes to a reduction in a weight ratio of wires to an aircraft.

Objects, features and advantages of the present invention will become more evident from the following detailed description and the accompanying drawings.

DESCRIPTION OF EMBODIMENTS

First Embodiment

An exemplary embodiment of a power system is described below with reference to the drawings.

Figure 1:
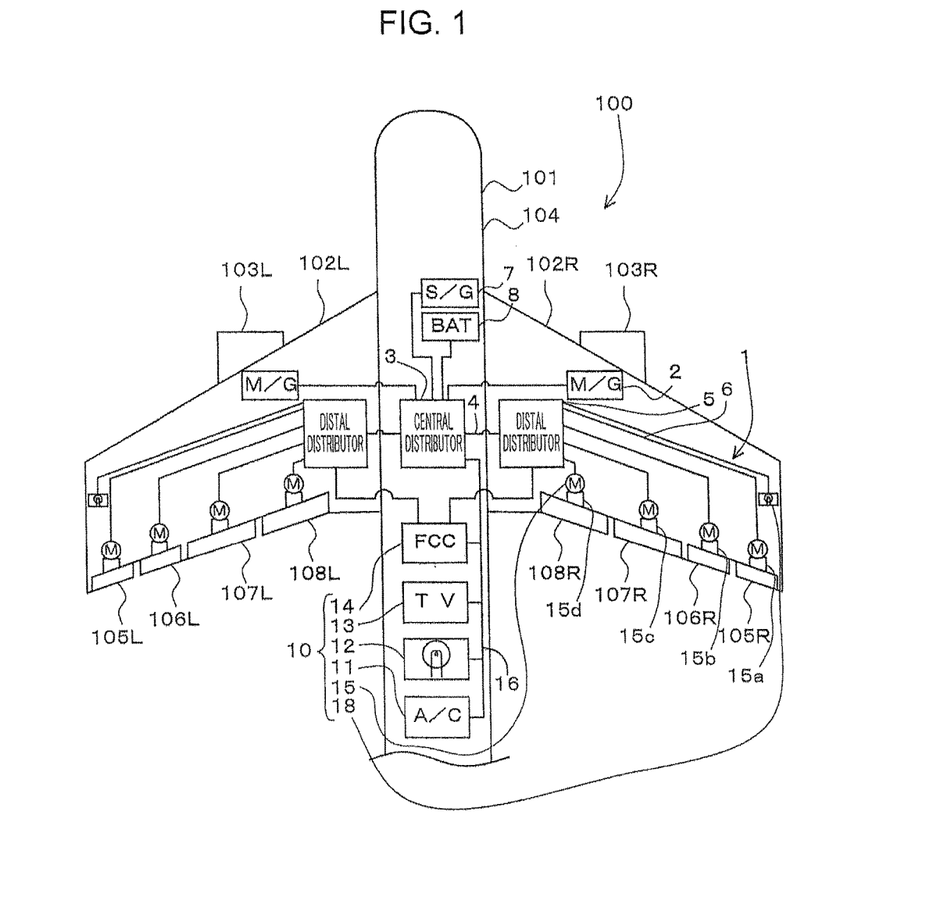
FIG. 1 is a schematic view showing a part of an aircraft having a power system according to the first embodiment.
Figure 2:
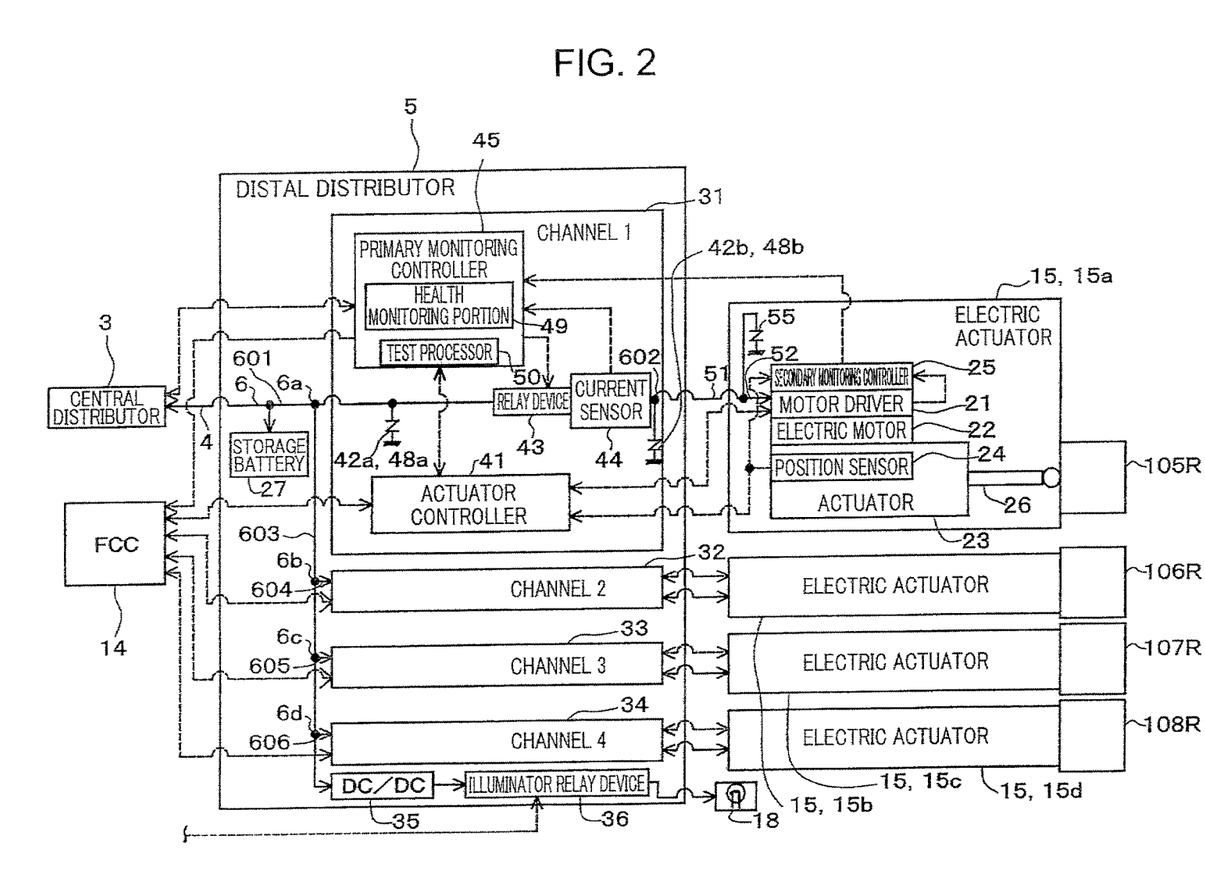
FIG. 2 is a schematic view of a main part of the power system.

FIG. 1 is a schematic view showing a part of an aircraft 100 having the exemplary power system 1 according to the first embodiment. FIG. 1 shows a front portion and a middle portion of a body 101 of an aircraft 100. A rear portion of the body 101 is not shown in FIG. 1. FIG. 2 is a schematic view of a main part of the power system 1.

In FIG. 2, wires indicated by solid lines are power wires (high-voltage wires) which supply power in order to operate electrical devices 10 such as the electric actuator 15*a*. On the other hand, wires indicated by dotted lines in FIG. 2 are signal wires (low-voltage wires) for controlling the electrical devices 10 such as the electric actuator 15*a*.

As shown in FIG. 1, for example, the aircraft 100 may be a passenger plane. The aircraft 100 includes a body 101, a pair of left and right engines 103L, 103R, and the power system 1.

The body 101 includes a fuselage 104, and a pair of left and right main wings 102L, 102R which are connected to the fuselage 104.

Ailerons 105L, 106L, 105R, 106R and spoilers 107L, 108L, 107R, 108R are provided on the main wings 102L, 102R as rudder surfaces. These ailerons 105L, 106L, 105R, 106R and the spoilers 107L, 108L, 107R, 108R are operated by electric actuators 15 (described below).

For example, the engines 103L, 103R may be jet engines for supplying thrust to the body 101. In the present embodiment, turbofan engines are used as the engines 103L, 103R. The engines 103L, 103R are installed on the main wings 102L, 102R. The engines 103L, 103R have rotary shafts (not shown). The engines 103L, 130R are used to generate power which is consumed by the power system 1.

The power system 1 shown in FIGS. 1 and 2 is one example of "distribution system". The power system 1 is configured to supply power to the electrical devices 10 situated in the aircraft 100.

Configuration of the power system 1 relating to the port (left) section of the body 101 is similar to configuration of the power system 1 relating to the starboard (right) section of the body 101. Therefore, the configuration of the power system 1 relating to the starboard section of the body 101 is mainly described in the present embodiment. Description about the configuration of the power system 1 relating to the port section of the body 101 is partially omitted.

It is one of features of the power system 1 according to the present embodiment that the aircraft 100 has a central distributor 3 and a distal distributor 5. The distal distributor 5 is away from the central distributor 3 in the aircraft 100. The distal distributor 5 may have a housing separate from a housing of the central distributor 3, various power distribution devices being stored in the housing of the distal distributor 5. The distal distributor 5 distributes power from the central distributor 3 to electrical devices 10 situated in the aircraft 100. The present embodiment uses a body earth structure, in which the body 101 forms a part of power supply paths to the electrical devices 10. The configuration of the power system 1 is further described below in detail.

The power system 1 has a primary power generator 2, a central distributor 3, a first power source wire 4, a distal distributor 5, a second power source wire 6 situated in the distal distributor 5, a secondary power generator 7, a main battery 8 and electrical devices 10.

The primary power generator 2 is provided as a primary power source device. The primary power generator 2 may supply power which is consumed by the power system 1. In the present embodiment, the primary power generator 2 is a DC power generator. The primary power generator 2 is driven by the engine 103R which gives thrust to the aircraft 100.

The secondary power generator 7 is provided as a secondary power source device. For example, the secondary power generator 7 may generate power when the primary power generator 2 is stopped. For example, the secondary power generator 7 may include a gas turbine engine and a power generator. Power is generated by the power generator, which is driven under operation of the gas turbine engine. In the present embodiment, the secondary power generator 7 is a DC power generator. The power is output from the secondary power generator 7 to the central distributor 3.

For example, the main battery 8 may be a secondary cell such as a lithium ion storage battery. The main battery 8 may supply power to the central distributor 3. The main battery 8 may store power from the primary or secondary power generator 2, 7.

The power system 1 according to the present embodiment is designed to cause optimal power distribution from each of the primary power generator 2, the secondary power generator 7 and the main battery 8.

In the present embodiment, the power system 1 uses DC power. However, the power system 1 may use AC power. In this case, a converter which converts power between DC and AC is incorporated in the power system 1. For example, if the primary and secondary power generators 2, 7 are AC power generators, the generated AC power is converted into DC power by an AC/DC converter in the central distributor 3. The DC power generated by the primary power generator 2 is supplied to the central distributor 3.

The central distributor 3 is provided as a primary power distribution board in the aircraft 100. The central distributor 3 is configured to distribute power from each of the primary power generator 2, the secondary power generator 7 and the main battery 8 to the distal distributor 5 and alike. In the present embodiment, power from all of the primary power generator 2, the secondary power generator 7 and the main battery 8 is output to the central distributor 3. For example, the central distributor 3 may include a DC/DC converter. The central distributor 3 is configured to convert a power voltage from the primary power generator 2 and alike.

The central distributor 3 is situated in the fuselage 104. In the present embodiment, the central distributor 3 is situated in the fuselage 104 between the main wings 102L, 102R. The central distributor 3 is connected to the first power source wire 4. The first power source wire 4 extends in the fuselage 104 and the main wing 102R. The first power source wire 4 is connected to the distal distributor 5. Therefore, the distal distributor 5 may receive power not from the primary power generator 2, the secondary power generator 7 or the main battery 8 but from the central distributor 3.

The distal distributor 5 is provided in order to distribute DC power supplied from the central distributor 3 to electric actuators 15 (15a, 15b, 15c, 15d) and a wing illuminator 18. The electric actuators 15 (15a, 15b, 15c, 15d) and the wing illuminator 18 are exemplified as the electrical devices. AC power may be supplied from the central distributor 3 to the distal distributor 5. The distal distributor 5 is connected electrically to the central distributor 3 via the first power source wire 4. The distal distributor 5 receives power supply from the central distributor 3. In this way, placement of the distal distributor 5 in addition to the central distributor 3 obviates independent wire arrangement from each of the electric actuators 15a, 15b, 15c, 15d and the wing illuminator 18 to the central distributor 3. Therefore, there is a reduction in weight of electrical wires in the aircraft 100. In addition, only a narrow space is required for the wire arrangement in the aircraft 100.

In the present embodiment, there is one first power source wire 4. The first power source wire 4 may be a coated wire constituted by a single conductive wire which is coated. Alternatively, the first power source wire 4 may be a coated wire in which several conducting wires are gathered to form a single conductive wire which is coated. Further alternatively, the first power source wire 4 may be a multi-core cable.

There may be several first power source wires 4. In this case, each of the first power source wires 4 is connected to the central distributor 3 and the distal distributor 5. For example, if a voltage of the first power source wire 4 is ±270 V, there may be two first power source wires 4. In this case, the body earth voltage of the body 101 is 0 V. In the present embodiment, the distal distributors 5 are situated in the main wings 102R, 102L. The distal distributors 5 are away from the central distributor 3. Detailed configurations of the distal distributors 5 are described below.

There may be several electrical devices 10. The electrical devices 10 are operated mainly by power which is generated by the primary power generator 2. For example, an air conditioner 11, an illuminator 12, a television system 13, a flight control computer (FCC) 14, electric actuators 15 (15a, 15b, 15c, 15d) and a main wing illuminator 18 are provided in the aircraft 100 as the electrical devices 10.

The air conditioner 11, the passenger cabin illuminator 12, the television system 13 and the flight control computer 14 are fuselage-mounted electrical devices, which are situated in the fuselage 104. Each of the air conditioner 11, passenger cabin illuminator 12, television system 13 and flight control computer 14 is connected directly to the central distributor 3 via a third power source wire 16. The air conditioner 11, the passenger cabin illuminator 12, the television system 13 and the flight control computer 14 operate under power supply from the central distributor 3.

The air conditioner 11 is used for temperature adjustment inside the passenger cabin of the fuselage 104. The passenger cabin illuminator 12 includes illuminators which are situated in the passenger cabin of the fuselage 104. The passenger cabin illuminator 12 is configured to illuminate an interior of the passenger cabin. The television system 13 includes television receivers which are situated in the passenger cabin of the fuselage 104. The television system 13 is configured to display various video images on the television receivers.

The flight control computer 14 includes a central processing unit (CPU), a random access memory (RAM) and a read only memory (ROM) and alike. The flight control computer 14 is provided as an integrated controller for flight of the aircraft 100. The flight control computer 14 is configured to output prescribed control signals in response to signals output from a control stick (not shown).

For example, if an instruction to operate the aileron 105R is transmitted from the control stick to the flight control computer 14, control signals for operating the aileron 105R are output from the flight control computer 14 to the distal distributor 5.

The electric actuators 15 (15a, 15b, 15c, 15d) are used for the flight control system. The electric actuators 15 (15a, 15b, 15c, 15d) operate in response to the control signals from the flight control computer 14. The electric actuators 15 are situated in the main wings 102R, 102L.

The electric actuators 15a, 15b are provided so as to move the ailerons 105R, 106R as movable wings. The electric actuators 15c, 15d are provided so as to move the spoilers 107R, 108R as movable wings. Since each of the electric actuators 15a, 15b, 15c, 15d has a similar configuration, the configuration of the electric actuator 15a is described in detail whereas detailed description about the electric actuators 15b, 15c, 15d is omitted in the present embodiment.

In the present embodiment, the electric actuator 15a includes a direct current (DC) servo motor. The electric actuator 15a is operated by DC power. The electric actuator 15a may be an alternating current (AC) servo motor. In this case, a converter which converts power between DC and AC is provided in the distal distributor 5. The AC power is supplied from this converter to the electric actuator 15a.

The electric actuator 15a has a motor driver 21, an electric motor 22, an actuator 23, a position sensor 24 and a secondary monitoring controller 25.

The motor driver 21 is a motor drive circuit. The motor driver 21 outputs prescribed power to the electric motor 22 in response to velocity instruction signals from an actuator controller 41 (described below) of the distal distributor 5. The motor driver 21 receives supply of current (current from the second power source wire 6) passing through a current sensor 44 (described below) of the distal distributor 5.

The electric motor 22 is driven under power supply from the motor driver 21. In the present embodiment, the electric motor 22 is a DC motor. Rotary motion of a rotary shaft of the electric motor 22 is transmitted to the actuator 23.

The actuator 23 is provided as a motion converting mechanism. The actuator 23 may convert rotary motion into linear motion and linear motion into rotary motion. In the present embodiment, the actuator 23 converts rotary motion of the rotary shaft of the electric motor 22 into linear motion. The actuator 23 converts linear motion resultant from displacement of the aileron 105R into rotary motion of the rotary shaft of the electric motor 22.

In the present embodiment, the actuator 23 includes a ball screw mechanism. The ball screw mechanism includes a movable portion 26 which includes a male thread member. The movable portion 26 is displaced linearly in response to rotation of the rotary shaft of the electric motor 22. The movable portion 26 is coupled to the point of load of the aileron 105R. The aileron 105R is swung around a prescribed fulcrum shaft under displacement of the movable portion 26.

For example, power supply to the electric motor 22 may be stopped when the aileron 105R is in an inclined attitude with respect to an immobile portion of the main wing 102R. In this case, the aileron 105S receives air resistance and rotates about a fulcrum shaft. Consequently, the aileron 105R is displaced towards the immobile portion of the main wing 102R. In this case, the point of load of the aileron 105S displaces the movable portion 26 linearly in response to the displacement of the aileron 105R. The linear motion of the movable portion 26 is converted into a rotary motion in the actuator 23 to cause rotation of the rotary shaft of the electric motor 22.

The electric motor 22 functions as a DC power generator to generate DC power during the rotation of the rotary shaft of the electric motor 22. In short, the electric motor 22 generates regenerative power. This regenerative power is supplied to a storage battery 27 via the motor driver 21, the current sensor 44 (described below) and a relay device 43. If a DC motor is used as the electric motor 22, the regenerative DC power is supplied to the storage battery 27 without conversion from AC to DC. The aforementioned displacement of the rotary shaft of the electric motor 22 (displacement of the movable portion 26) (i.e. a steering surface angle of the aileron 105R) is measured by a position sensor 24.

The position sensor 24 is configured to detect a position of the movable portion 26 of the electric actuator 15a. In the present embodiment, position signals are output from the position sensor 24 to the secondary monitoring controller 25 (described below) and an actuator controller 41 (described below).

The secondary monitoring controller 25 is provided in order to determine whether or not there is abnormality in the electric actuator 15a. The secondary monitoring controller 25 is provided in order to output signals specifying a power amount output from the motor driver 21 and position signals from the position sensor 24 to the primary monitoring controller 45 of the distal distributor 5.

For example, the secondary monitoring controller 25 includes a CPU, a RAM and a ROM. The secondary monitoring controller 25 reads position signals output from the position sensor 24. The secondary monitoring controller 25 stores the position signals as digital data. Data specifying a power amount output from the electric motor 22 to the motor driver 21 is transmitted from the motor driver 21 to the secondary monitoring controller 25, so that the secondary monitoring controller 25 stores the data as digital data. The secondary monitoring controller 25 outputs the aforementioned digital data to the primary monitoring controller 45. The secondary monitoring controller 25 reads velocity instruction signals which are supplied from the actuator controller 41 to the motor driver 21.

As described above, the secondary monitoring controller 25 monitors whether or not there is abnormality in the electric actuator 15a. More specifically, for example, the secondary monitoring controller 25 determines whether or not a difference between a target position of the movable portion 26, which the velocity instruction signals generated by the actuator controller specifies a prescribed time after the generation of the velocity instruction signals, and an actual position of the movable portion 26, which is detected by the position sensor 24, is within a prescribed range.

If the difference is within the prescribed range, the secondary monitoring controller 25 determines that the electric actuator 15a is normal. In this case, notification signals indicating that the electric actuator 15a operates normally are output from the secondary monitoring controller 25 to the flight control computer 14 via the primary monitoring controller 45.

On the other hand, for instance, if the actuator 23 is locked by foreign objects trapped in the actuator 23, the electric motor 22 and the actuator 23 may not operate even under the velocity instruction signals transmitted to the motor driver 21. As a result, there are unchanged position signals indicating a position of the movable portion 26. In this case, the difference between the target and actual positions exceeds the prescribed range.

In this case, the secondary monitoring controller 25 determines that there is abnormality in the electric actuator 15a, and then notification signals for reporting the abnormality are output to the flight control computer 14 via the primary monitoring controller 45. The primary monitoring controller 45 is provided in the distal distributor 5.

In the present embodiment, the distal distributor 5 is exclusively used as a distal distributor for a flight control system. The distal distributor 5 supplies power to the electric actuators 15 (15a, 15b, 15c, 15d) relating to flight control of the aircraft 100 and the wing illuminator 18. The distal distributor 5 receives power supply from the primary power generator 2, the secondary power generator 7 or the main battery 8, or alike of the aircraft 100 via the central distributor 3. Electric power is output from the distal distributor 5 to the electric actuators 15 (15a, 15b, 15c, 15d) and the wing illuminator 18. The distal distributor 5 is configured to output power from the storage battery 27 to the electric actuators 15a, 15b, 15c, 15d and the wing illuminator 18. In this way, devices other than devices of the light control system (wing illuminators 18) may be connected to the distal distributor 5.

The wing illuminator 18 is an illumination device provided on the main wings 102R, 102L as a wing-mounted electric device. For example, the wing illuminators 18 are situated at the ends of the main wings 102R, 102L in the left/right direction of the aircraft 100. Each of the wing illuminators 18 has emitters configured to emit light outside the aircraft 100. In the present embodiment, the emitter emits light using DC power. As described above, the wing illuminator 18 is supplied with power from the distal distributor 5.

The distal distributor 5 includes a second power source wire 6, an storage battery 27, channels 31, 32, 33, 34, DC/DC converter 35 and an illuminator relay device 36.

For example, the second power source wire 6 is connected to the first power source wire 4 by an electric connector (not shown).

The second power source wire 6 has a first portion 601, a second portion 602, a third portion 603, a fourth portion 604, a fifth portion 605 and a sixth portion 606.

The first portion 601 connects the first power source wire 4 to a relay device 43 (described below) of a channel 31. The second portion 602 connects the current sensor 44 of the channel 31 (described below) to a fourth power source wire 51. The fourth power source wire 51 is connected to the motor driver 21 via a power source wire 52 in the electric actuator 15a. The third portion 603 branches from a bifurcation 6a of the first portion 601. The fourth portion 604 branches from a bifurcation 6b of the third portion 603. The fourth portion 604 is connected to the channel 32. The fifth portion 605 branches from a bifurcation 6c of the third portion 603. The fifth portion 605 is connected to the channel 33. The sixth portion 606 branches from a bifurcation 6d of the third portion 603. The sixth portion 606 is connected to the channel 34. The third portion 603 is connected to a DC/DC converter 35.

The DC/DC converter 35 is provided in order to convert a power voltage supplied from the central distributor 3 to the DC/DC converter 35 via the bifurcation 6a or alike. In the present embodiment, the DC/DC converter 35 is configured to convert high-voltage power from the central distributor 3 or the storage battery 27 to a lower voltage. An illuminator relay device 36 is situated between the DC/DC converter 35 and the wing illuminator 18.

The illuminator relay device 36 is provided in order to selectively set power supply or power interruption between the distal distributor 5 and the wing illuminator 18. In short, the illuminator relay device 36 may interrupt a current flowing between the distal distributor 5 and the wing illuminator 18. The illuminator relay device 36 includes an electromagnetic relay. The illuminator relay device 36 is provided in the second power source wire 6 between the DC/DC converter 35 and the wing illuminator 18. The illuminator relay device 36 is connected to a switch in the cockpit (not shown). A pilot or alike operates the switch to give the illuminator relay device 36 an instruction to perform an on or off operation. For instance, the switch is operated so as to supply power to the wing illuminator 18 when the aircraft 100 flies at night. The illuminator relay device 36 is connected to the wing illuminator 18.

The storage battery 27 is connected to the first portion 601 of the second power source wire 6 between a connecting portion to the first power source wire 4 and the bifurcation 6a.

The storage battery 27 is provided in order to store regenerative power generated by the respective electric actuators 15a, 15b, 15c, 15d. For example, the storage battery 27 may be a secondary cell such as a lithium ion storage battery, a flywheel battery, a capacitor or alike. The storage battery 27 is chargeable and dischargeable. The storage battery 27 is connected to the first power source wire 4 via the second power source wire 6. The storage battery 27 may store electric power from the central distributor 3. For example, the storage battery 27 supplies power to the channels 31, 32, 33, 34 (the electric actuators 15a, 15b, 15c, 15d) and the wing illuminator 18 when there is a decrease in the power supplied from the central distributor 3.

Each of the channels 31, 32, 33, 34 are provided as a unit controller for controlling the corresponding one of the electric actuators 15a, 15b, 15c, 15d. Each of the channels 31, 32, 33, 34 has a similar configuration. Therefore, a configuration of the channel 31 for controlling the electric actuator 15a is mainly described whereas detailed description about the channels 32, 33, 34 is omitted.

The analogous configuration among the channels 31, 32, 33, 34 does not limit principles of the present embodiment in any way. For instance, at least a part of the configurations of the channels 31, 32, 33, 34 may be different.

The channel 31 has an actuator controller 41, lightning surge protectors 42a, 42b, a relay device 43, a current sensor 44 and a primary monitoring controller 45.

The actuator controller 41 is provided in order to control the electric actuator 15a. The actuator controller 41 is connected to the flight control computer 14, the primary monitoring controller 45 and the motor driver 21 of the electric actuator 15a. The actuator controller 41 is formed by using a CPU, a RAM, a ROM and alike. This actuator controller 41 is configured to generate signals for causing the electric actuator 15a to perform an operation in response to control signals from the flight control computer 14.

The actuator controller 41 reads control signals output from the flight control computer 14 and position signals from the position sensor 24. The actuator controller 41 generates velocity instruction signals in response to these signals.

The actuator controller 41 calculates a target position of the movable portion 26 under feedback control using control signals from the flight control computer 14 and signals representing a position of the movable portion 26 detected by the position sensor 24. The actuator controller 41 generates velocity instruction signals for displacing the movable portion 26 to the target position. The actuator controller 41 outputs the velocity instruction signals to the motor driver 21 of the electric actuator 15a.

The lightning surge protectors 42a, 42b allow a large current such as a lightning current to escape outside the aircraft 100 when the large current is input from the electric actuator 15a or alike to the first and second portions 601, 602 of the second power source wire 6. The lightning surge protectors 42a, 42b makes a large current such as a lightning surge current less likely to flow to the central distributor 3. For example, the lightning surge protectors 42a, 42b include variable resistances 48a, 48b.

One end of the variable resistance 48a is connected to the first portion 601 of the second power source wire 6 between the bifurcation 6a and the relay device 43. For example, the other end of the variable resistance 48a is connected to a discharge cable (not shown). One end of the variable resistance 48b is connected to the second portion 602. For example, the other end of the variable resistance 48b is connected to a discharge cable (not shown). According to the aforementioned configuration, the lightning surge protectors 42a, 42b are connected electrically to the electric motor 22 of the electric actuator 15a via the first and second portions 601, 602 of the second power source wire 6 and alike.

The lightning surge protector 42b (variable resistance 48b) may not be situated in the channel 31. For example, the variable resistance 48b may be situated outside the channel 31 in the distal distributor 5.

In the present embodiment, a lightning surge protector 55 is provided in addition to the lightning surge protectors 42a, 42b. For example, the lightning surge protector 55 is a variable resistance. One end of the lightning surge protector 55 is connected to the power source wire 52 in the electric actuator 15a. The other end of the lightning surge protector 55 is connected to a discharge cable (not shown).

In the present embodiment, the variable resistances 42a, 42b, 55 are exemplified as the variable resistances for countering lightning surges. However, in addition to the aforementioned variable resistances, the variable resistances for countering lightning surges are preferably provided in all signal wires and power source wires connected to the distal distributor 5 and in all of signal wires and power source wires connected to the electric actuator 15.

The relay device 43 between the distal distributor 5 and the electric actuator 15a selectively sets connection and interruption of drive power for the electric motor 22 of the electric actuator 15a. In short, the relay device 43 may interrupt a current flowing between the distal distributor 5 and the electric actuator 15a. The relay device 43 includes an electromagnetic relay. The relay device 43 in the second power source wire 6 is provided between the lightning surge protector 42a and the current sensor 44 (between the first portion 601 and the second portion 602). The relay device 43 in the second power source wire 6 is provided between the storage battery 27 and the electric actuator 15a. The relay device 43 is connected to the primary monitoring controller 45. The relay device 43 is controlled by the primary monitoring controller 45.

When the primary monitoring controller 45 controls the relay device 43 to an on state, power may be supplied from the central distributor 3 to the electric actuator 15a via the second portion 602 of the second power source wire 6 or alike. In this case, regenerative power of the electric motor 22 may be supplied to the storage battery 27. On the other hand, when the relay device 43 is controlled to an off state by the primary monitoring controller 45, there is interruption of power supply from the central distributor 3 to the second power source wire 6 in the channel 31. In short, since current flowing from the second power source wire 6 is interrupted between the distal distributor 5 and the electric actuator 15a, there is interruption of power supply from the distal distributor 5 to the motor driver 21 and the electric motor 22 of the electric actuator 15a.

In this case, there is interruption of the power supply from the electric actuator 15a to the second power source wire 6. In short, there is interruption of power supply from the electric actuator 15a to the storage battery 27. The relay device 43 is adjacent to the current sensor 44.

The current sensor 44 is provided in order to detect a current (current value) in the channel 31, the current flowing in the second power source wire 6. Current detection signals generated by the current sensor 44 are output to the primary monitoring controller 45.

The primary monitoring controller 45 is provided in order to monitor whether there is abnormality in the electric actuator 15a. In the present embodiment, the primary monitoring controller 45 is provided in order to execute different control from control executed by the actuator controller 41. The primary monitoring controller 45 controls opening and closing operations of the relay device 43 (switch) which is connected to the primary monitoring controller 45.

The primary monitoring controller 45 is formed by using a CPU, a RAM, a ROM and alike. In the present embodiment, the primary monitoring controller 45 and the actuator controller 41 are configured by using different central processing units (CPUs). The primary monitoring controller 45 is configured to execute control about operations of the electric actuator 15a on the basis of information from the actuator controller 41, information from the electric actuator 15a and information from the current sensor 44.

More specifically, velocity instruction signals for the motor driver 21 (electric motor 22) and data specifying a power amount output from the motor driver 21 to the electric motor 22 are transmitted from the secondary monitoring controller 25 of the electric actuator 15a to the primary monitoring controller 45. Signals representing a current value between the first and second portions 601, 602 of the second power source wire 6 in channel 31 are transmitted from the current sensor 44 to the primary monitoring controller 45. Position signals from the position sensor 24 are transmitted from the actuator controller 41 to the primary monitoring controller 45.

The primary monitoring controller 45 includes a health monitoring portion 49 and a test processor 50.

The health monitoring portion 49 may monitor and diagnose operational states of the electric actuator 15a. More specifically, the health monitoring portion 49 diagnoses an operating state (efficiency) of the electric actuator 15a on the basis of a relationship between a power amount supplied from the distal distributor 5 to the electric actuator 15a and a mechanical operation amount of the movable portion 26 of the electric actuator 15a. Processes of the health monitoring portion 49 are described below more specifically.

For example, the test processor 50 of the primary monitoring controller 45 is provided in order to carry out operational tests of the electric actuator 15a when the power system 1 is activated. In short, the test processor 50 is used when the aircraft 100 is parked. The test processor 50 may be used as an incorporated test device, which is incorporated into the aircraft 100.

In the present embodiment, the test processor 50 is configured to test the electric actuator 15a. The test processor 50 is not limited to a test of the electric actuator 15a. The test processor 50 may be configured to carry out an operational test of the relay device 43. Processes of the test processor 50 are described below more specifically.

The primary monitoring controller 45 is connected to the flight control computer 14. Process contents of the primary monitoring controller 45 are output to the flight control computer 14.

Figure 3:
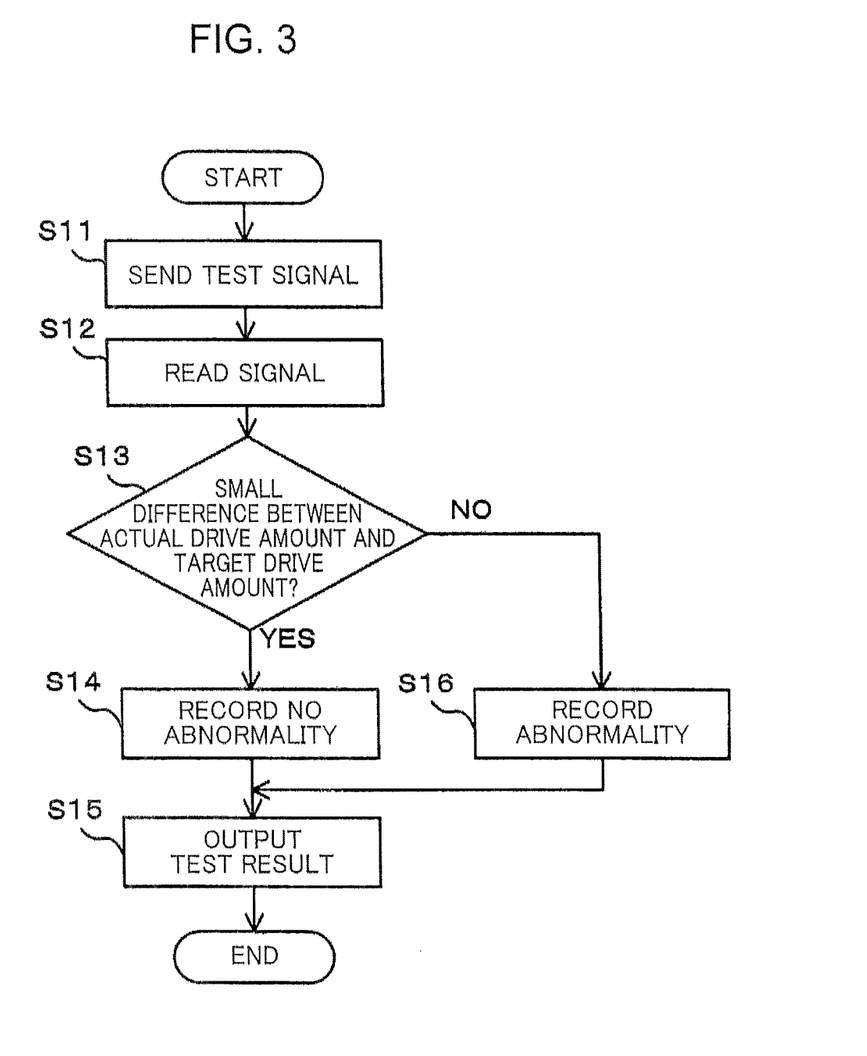
FIG. 3 is a flowchart showing exemplary control in a test processor of a primary monitoring controller.

An exemplary process flow in the primary monitoring controller 45 is described. FIG. 3 is a flowchart showing exemplary control of the test processor 50 of the primary monitoring controller 45. Diagrams other than the flowcharts may be also referred as appropriate in the description with reference to the flowcharts.

As shown in FIG. 3, the test processor 50 firstly outputs test signals to the actuator controller 41 (step S11). For example, the test signals instruct the electric actuator 15a to change a steering surface angle of the aileron 105R by several degrees. The test signals are simulated signals which simulate control signals of the flight control computer 14.

The actuator controller 41 receiving the test signals generates velocity instruction signals for changing a steering surface angle of the aileron 105R by several degrees. The actuator controller 41 outputs the velocity instruction signals to the motor driver 21. Without abnormality in the electric actuator 15a, the rotary shaft of the electric motor 22 of the electric actuator 15a rotates by a rotation amount instructed by the velocity instruction signals. Accordingly, the steering surface angle of the aileron 105R is changed by several degrees since the movable portion 26 is displaced by a prescribed amount.

Next, the test processor 50 reads signals output from the secondary monitoring controller 25 (step S12). The test processor 50 then determines a difference between the actual drive amount of the movable portion 26 (the rotary shaft of the electric motor 22), which is specified by the signals output from the secondary monitoring controller 25, and the target drive amount specified by the test signal (step S13).

If the difference between the actual drive amount and the target drive amount is no more than a prescribed threshold value, the test processor 50 determines that the difference between the actual drive amount and the target drive amount is small (YES at step S13). In this case, the test processor 50 records test result signals indicating that there is no abnormality in the test result (step S14), and also outputs the test result signals to the central distributor 3 and the flight control computer 14 (step S15).

On the other hand, if the difference between the actual drive amount and the target drive amount exceeds the prescribed threshold value, the test processor 50 determines that the difference between the actual drive amount and the target drive amount is large (NO at step S13). In this case, the test processor 50 records test result signals indicating that there is abnormality in the test result (step S16), and also outputs the test result signals to the central distributor 3 and the flight control computer 14 (step S15).

Figure 4:
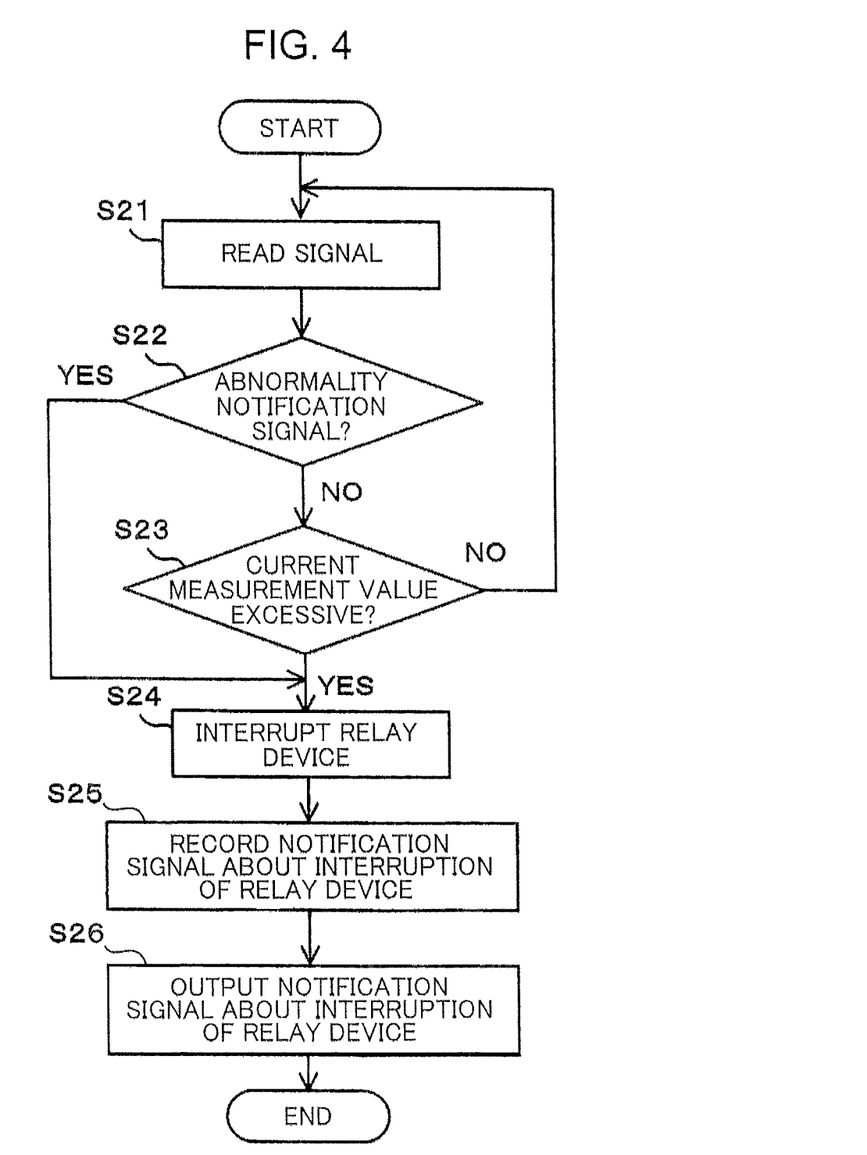
FIG. 4 is a flowchart showing exemplary control for a relay device of the primary monitoring controller.

Exemplary control of the relay device 43 in the primary monitoring controller 45 is described. FIG. 4 is a flowchart showing exemplary control of the relay device 43 in the primary monitoring controller 45. As shown in FIG. 4, the relay device 43 is always switched on when the aircraft 100 is in operation. Power supplied from the central distributor 3 to the second power source wire 6 may be transmitted by the relay device 43 to the electric actuator 15a. In this state, the primary monitoring controller 45 reads signals from the flight control computer 14 and the current sensor 44 (step S21).

The primary monitoring controller 45 then determines whether or not notification signals indicating abnormality (abnormality notification signals) are output from the flight control computer 14 (step S22). When abnormality notification signals are output from the flight control computer 14 (YES at step S22), the primary monitoring controller 45 interrupts the relay device 43 by turning the relay device 43 to an off state (step S24). Consequently, there is interruption of current passage from the central distributor 3 to the electric actuator 15a via the second power source wire 6. In short, the motor drive power source of the electric actuator 15a is interrupted.

On the other hand, without abnormality notification signals output from the flight control computer 14 (NO at step S22), the primary monitoring controller 45 determines whether or not a current value of the second power source wire 6 detected by the current sensor 44 is excessive (abnormal) (step S23). More specifically, if there is no abnormality in the electric actuator 15a and if the aforementioned current measurement value is no greater than the prescribed threshold value, the primary monitoring controller 45 does not determine that the current value is excessive (NO at step S23). In this case, the primary monitoring controller 45 repeats the process in step S21 again.

On the other hand, the electric motor 22 may be shorted by faults in the electric actuator 15a. As a result, for example, an abnormal current may flow in the second portion 602 of the second power source wire 6. For instance, an abnormal current may flow in the second portion 602 of the second power source wire 6 as a result of earth fault of the fourth power source wire 51.

In these cases, the current value of the second portion 602 of the second power source wire 6 exceeds the prescribed threshold value (YES at step S23). In this case, the primary monitoring controller 45 interrupts the relay device 43 as described above (step S24).

When the relay device 43 is interrupted, the primary monitoring controller 45 generates notification signals indicating interruption of the relay device 43. The notification signals, which indicate the interruption of the relay device 43, are stored in the primary monitoring controller 45 (step S25). The notification signals indicating the interruption of the relay device 43 are output from the primary monitoring controller 45 to the central distributor 3 and the flight control computer 14 (step S26).

Figure 5:
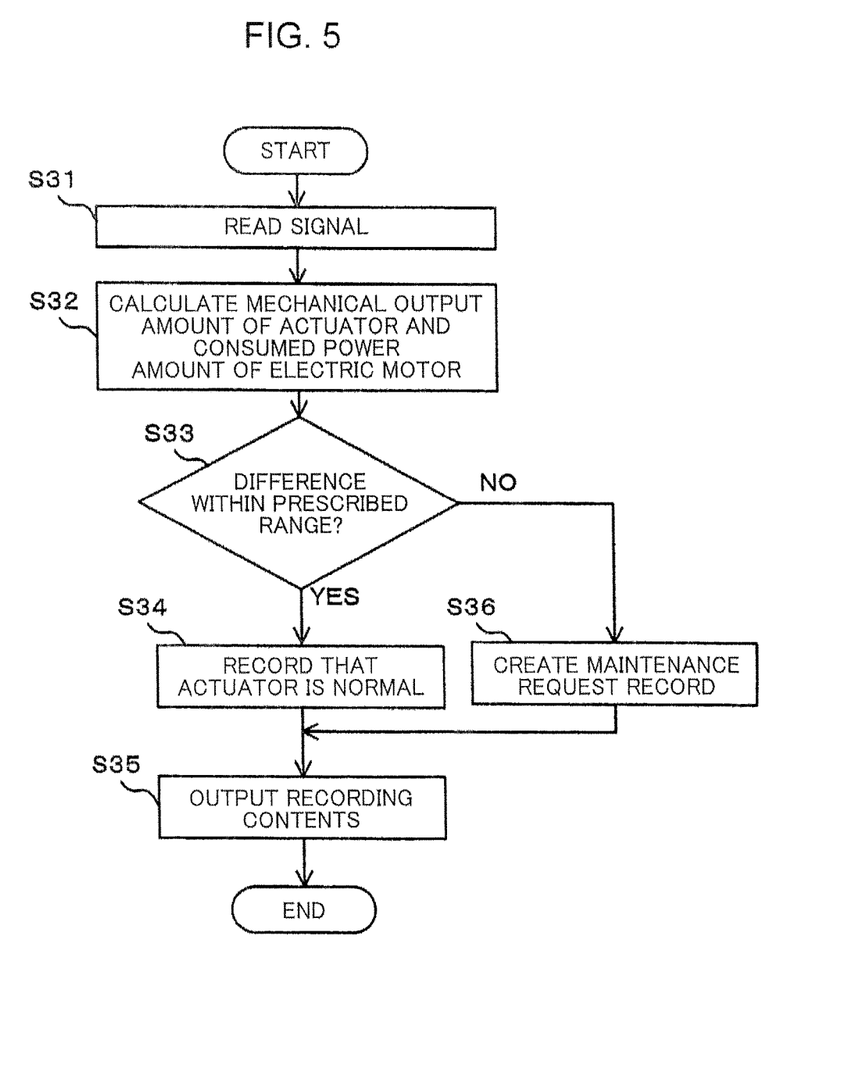
FIG. 5 is a flowchart showing an exemplary process flow in a health monitoring portion of the primary monitoring controller.

Exemplary processes by the health monitoring portion 49 of the primary monitoring controller 45 are described. FIG. 5 is a flowchart showing an exemplary process flow in the health monitoring portion 49 of the primary monitoring controller 45.

As shown in FIG. 5, the health monitoring portion 49 operates while the aircraft 100 is parked and while the aircraft 100 operates. The health monitoring portion 49 reads signals from the secondary monitoring controller 25 of the electric actuator 15a (step S31).

The health monitoring portion 49 then calculates a mechanical output amount of the actuator 23 and a power consumption amount of the electric motor 22 (step S32). In this case, the mechanical output amount of the actuator 23 means a displacement amount of the movable portion 26 of the actuator 23. The power consumption amount of the electric motor 22 indicates a power supply amount from the motor driver 21 to the electric motor 22.

The health monitoring portion 49 then compares the mechanical output amount of the actuator 23 to the power consumption amount of the electric motor 22 (step S33). For example, if a difference between the mechanical output amount of the actuator 23 and the power consumption amount of the electric motor 22 is within the prescribed range (YES in step S33), the health monitoring portion 49 determines that there is a small difference between the power consumption amount of the electric motor 22 and the mechanical output amount of the actuator 23.

In this case, since there is high conversion efficiency between power (electrical energy) and kinetic energy in the electric actuator 15a, it is not expected that the electric actuator 15a have reached the maintenance period. Therefore, the health monitoring portion 49 generates recorded data indicating that the electric actuator 15a is in a normal state in which maintenance is not required (step S34). The health monitoring portion 49 outputs the recorded data to the flight control computer 14 (step S35).

On the other hand, if the difference between the mechanical output amount of the actuator 23 and the power consumption amount of the electric motor 22 exceeds a prescribed range (NO in step S33), the health monitoring portion 49 determines that there is a large difference between the power consumption amount of the electric motor 22 and the mechanical output amount of the actuator 23. In this case, for example, it is expected that conversion efficiency between power (electrical energy) and kinetic energy in the electric actuator 15a has declined because of a decrease in lubricating oil or alike, which is applied to the movable portion 26 of the actuator 23.

In this case, it is determined that the electric actuator 15a has reached the maintenance period. Therefore, the health monitoring portion 49 generates recorded data indicating that the electric actuator 15a has reached the maintenance period (step S36). The health monitoring portion 49 outputs the recorded data to the flight control computer 14 (step S35).

As described above, according to the power system 1 according to the present embodiment, the distal distributor 5 is away from the central distributor 3 in the aircraft 100. Power is supplied from the distal distributor 5 to the electric actuator 15 and the wing illuminator 18 via the second power source wire 6. Therefore, wires extending to the electric actuator 15 placed in the aircraft 100 and to the wing illuminator 18 do not have to extend directly to the central distributor 3. Consequently, there is a short total length of the wires in the aircraft 100. In short, the power system 1 may achieve a decreased weight ratio of the wires to the aircraft 100.

According to the power system 1, the central distributor 3 and the distal distributor 5 are electrically connected by at least one first power source wire 4. According to this configuration, when the central distributor 3 and the distal distributor 5 are connected by one first power source wire 4, there is a smaller weight ratio of the wires to the aircraft 100. If the central distributor 3 and the distal distributor 5 are connected by two or more first power source wires 4, power supply from the central distributor 3 to the distal distributor 5 may be carried out very reliably even under connection faults or alike in a part of the first power source wire 4.

According to the power system 1, DC power is supplied from the central distributor 3 to the distal distributor 5. According to this configuration, there is a short distance between the central distributor 3 and the distal distributor 5 which are situated in the aircraft 100. Therefore, there is small transmission loss of DC power supply from the central distributor 3 to the distal distributor 5. With regard to power supply from the central distributor 3 to the distal distributor 5, power is supplied from the central distributor 3 to the distal distributor 5 directly as DC power, which is often used by the electrical devices 10. Therefore, power from the central distributor 3 does not have to be converted from AC to DC by the distal distributor 5. Consequently, there is high power usage efficiency in the power system 1 due to a decrease in power loss. A converter for converting power between AC power and DC power is not required for the power supply from the central distributor 3 to the distal distributor 5. Consequently, the power system 1 may have a very simple configuration.

According to the power system 1, the distal distributor 5 is electrically connected to several electric actuators 15 (15a, 15b, 15c, 15d). According to this configuration, the electric actuators 15 require a large power amount to drive the corresponding ailerons 105R, 106R and the spoilers 107R, 108R. Therefore, there is a large diameter of the second power source wire 6 which is connected to each electric actuator 15. Consequently, the second power source wire 6 is likely to become heavy. Accordingly, connection of the second power source wire 6 between the electric actuators 15 and the distal distributor 5 makes the second power source wire 6 shortened. Therefore, there is a reduced weight of the second power source wire 6. Accordingly, there is a reduced weight ratio of the wires to the aircraft 100.

According to the power system 1, the central distributor 3 is situated in the fuselage 104 of the aircraft 100. The distal distributors 5 are situated in the main wings 102R, 102L of the aircraft 100. According to this configuration, the central distributor 3 may supply power to the air conditioner 11, the illuminator 12 and the television system 13 and alike via the short third power source wire 16, the air conditioner 11, the illuminator 12 and the television system 13 and alike being used in the cabin inside the fuselage 104 or alike. The distal distributor 5 may supply power to the electric actuator 15 and the wing illuminator 18 by using the short second power source wire 6, the electric actuator 15 and the wing illuminator 18 being situated in the main wings 102R, 102L. Accordingly, there is a reduced weight ratio of the wires to the aircraft 100.

Modification Examples

Various modifications may be applied to the aforementioned embodiment. Various modifications are described below.

(1) In the aforementioned embodiment, the lightning surge protectors 42a, 42b are provided in the channels 31, 32, 33, 34. Alternatively, the lightning surge protectors 42a, 42b may be omitted. Only one lightning surge protector may be provided in the distal distributor 5. In this case, for example, the lightning surge protector is provided in the first portion 601 of the second power source wire 6 between the storage battery 27 and the bifurcation 6a.

(2) In the aforementioned embodiment, the electric actuators 15 and the wing illuminator 18 are connected to the distal distributor 5. Alternatively, electrical devices other than the electric actuators 15 and the wing illuminator 18 may be connected to the distal distributor 5.

(3) In the aforementioned embodiment, a channel is provided for each electric actuator 15. Alternatively, one channel 31 may simultaneously control the electric actuators 15.

(4) In the aforementioned embodiment, signals are output from the secondary monitoring controller 25 to the flight control computer 14 via the distal distributor 5. Alternatively, the signals may not be output via the distal distributor 5 but directly from the secondary monitoring controller 25 to the flight control computer 14.

(5) In the aforementioned embodiment, the primary monitoring controller 45 is situated in the distal distributor 5 whereas the secondary monitoring controller 25 is situated in the electric actuator 15a. Alternatively, the primary monitoring controller 45 may be situated in the electric actuator 15a whereas the secondary monitoring controller 25 may be situated in the distal distributor 5.

Figure 6:
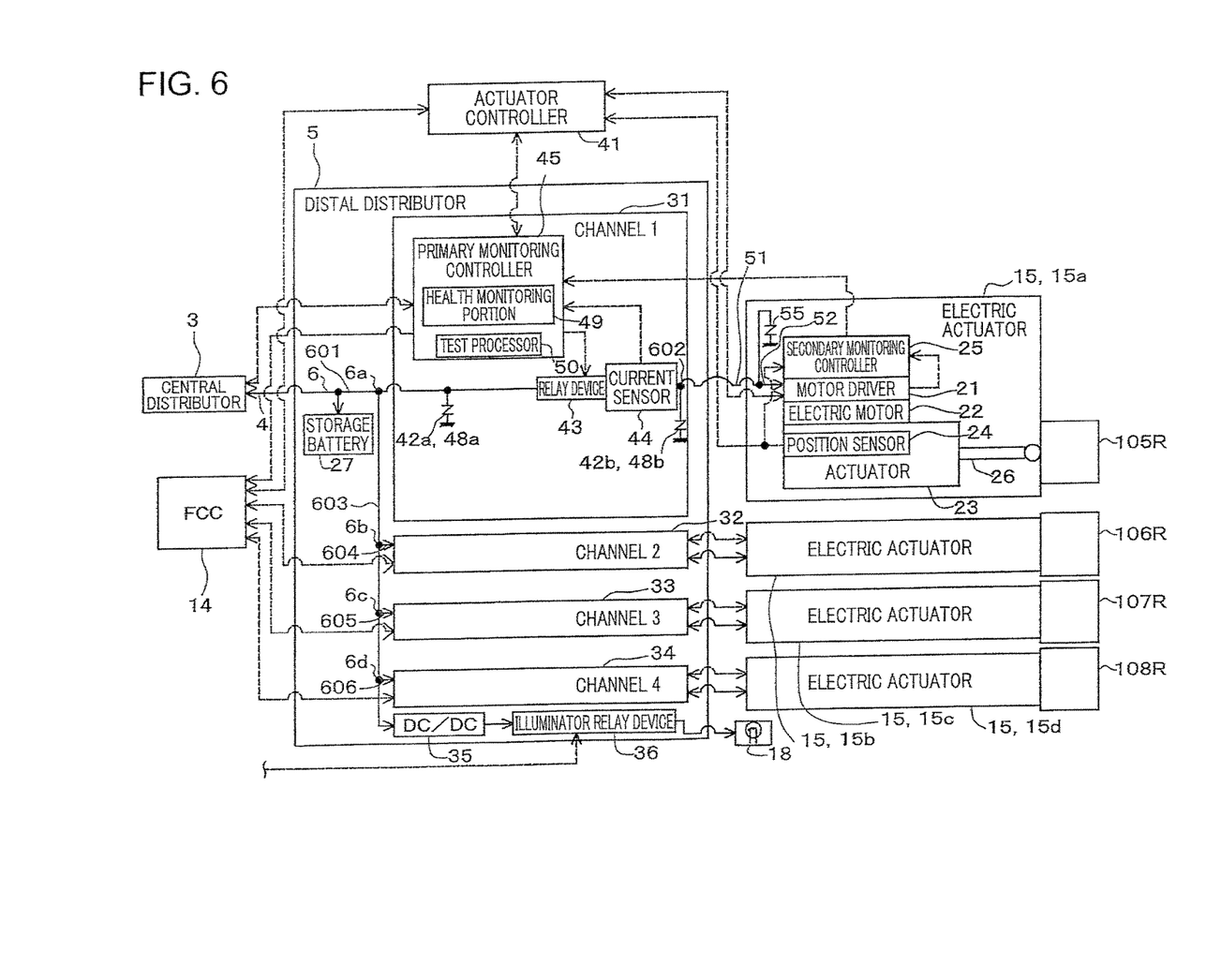
FIG. 6 is a diagram showing a modification of the first embodiment.

(6) In the aforementioned embodiment, the actuator controller 41 is situated in the distal distributor 5. Alternatively, the actuator controller 41 may be situated outside the distal distributor 5. For example, as shown in FIG. 6, the actuator controller 41 may be situated separately from the electric actuator 15a outside the distal distributor 5 or may be placed adjacently to the electric actuator 15a. In this case, the actuator controller 41 is connected to the flight control computer 14, the motor driver 21, the position sensor 24, the secondary monitoring controller 25 and the primary monitoring controller 45.

Figure 7:
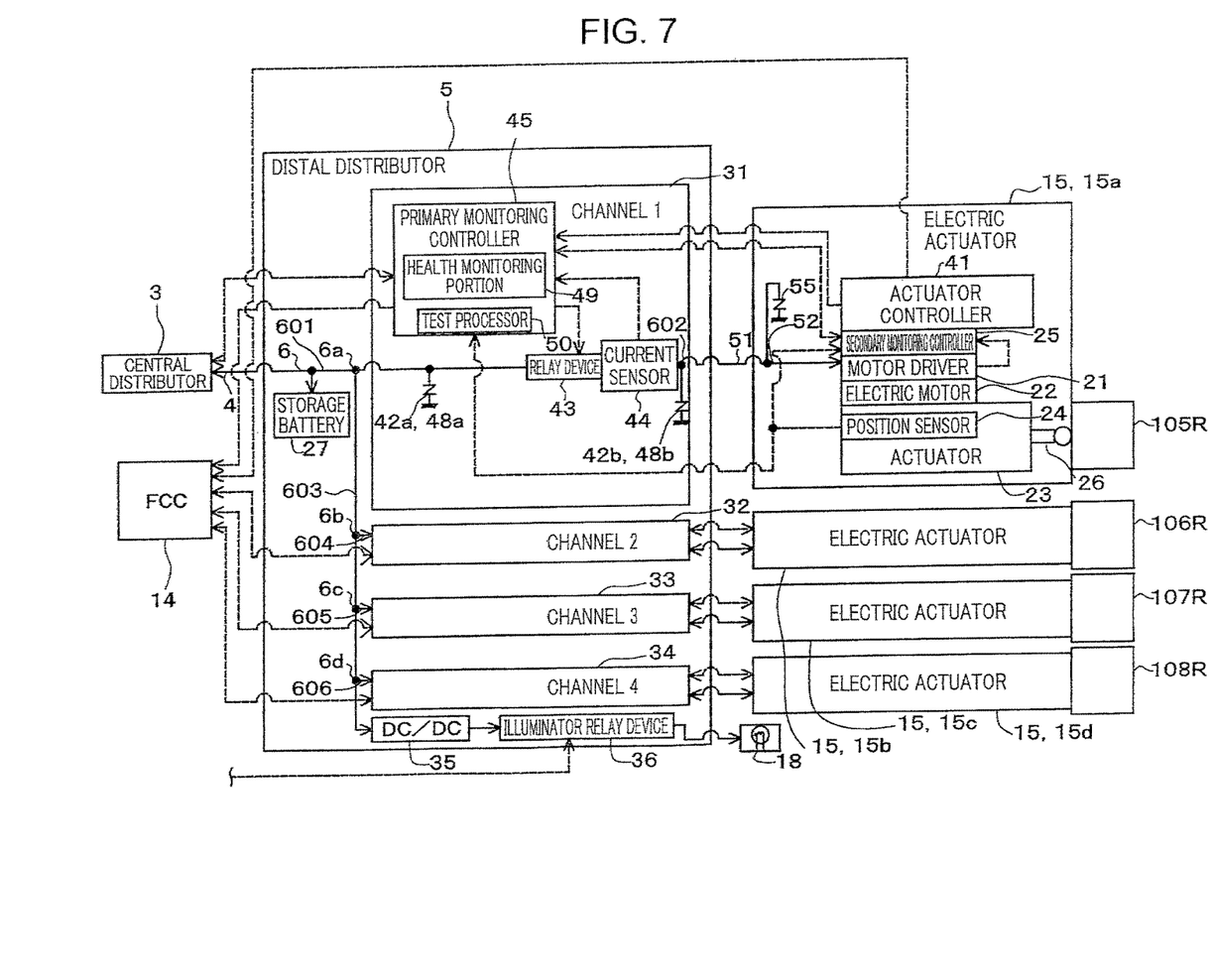
FIG. 7 is a diagram showing another modification of the first embodiment.

(7) As shown in FIG. 7, for example, the actuator controller 41 may be provided integrally with the electric actuator 15a if the actuator controller 41 is situated outside the distal distributor 5. In this case, the actuator controller 41 is connected to the flight control computer 14, the motor driver 21, the position sensor 24, the secondary monitoring controller 25 and the primary monitoring controller 45. In this case, as shown in FIG. 7, control signals from the flight control computer 14 to the actuator controller 41 may be routed via the distal distributor 5 or may bypass the distal distributor 5. In the example shown in FIG. 7, the actuator controller 41 is connected directly to the flight control computer 14 and the primary monitoring controller 45. The position sensor 24 is connected directly to the secondary monitoring controller 25 and the primary monitoring controller 45.

(8) For example, if some abnormality happens to the power system 1, the actuator 23 of the electric actuator 15a may be controlled to become a free state (a state where the rotary shaft of the electric motor 22 may rotate freely), a locked state or a damping state. In this case, for instance, it may be preferable that a clutch mechanism and a brake mechanism are provided between the rotary shaft of the electric motor 22 and the actuator 23. According to such a configuration, the movable portion 26 (movable wing) may be displaced freely by the clutch mechanism interrupting the coupling between the rotary shaft and the actuator 23. The displacement of the movable portion 26 (movable wing) is restricted by the brake mechanism.

(9) In the aforementioned embodiment, the electric actuator 15 has a ball screw mechanism. Alternatively, the electric actuator 15 may be provided with an electro hydrostatic actuator (EHA), instead of the ball screw mechanism.

Figure 8:
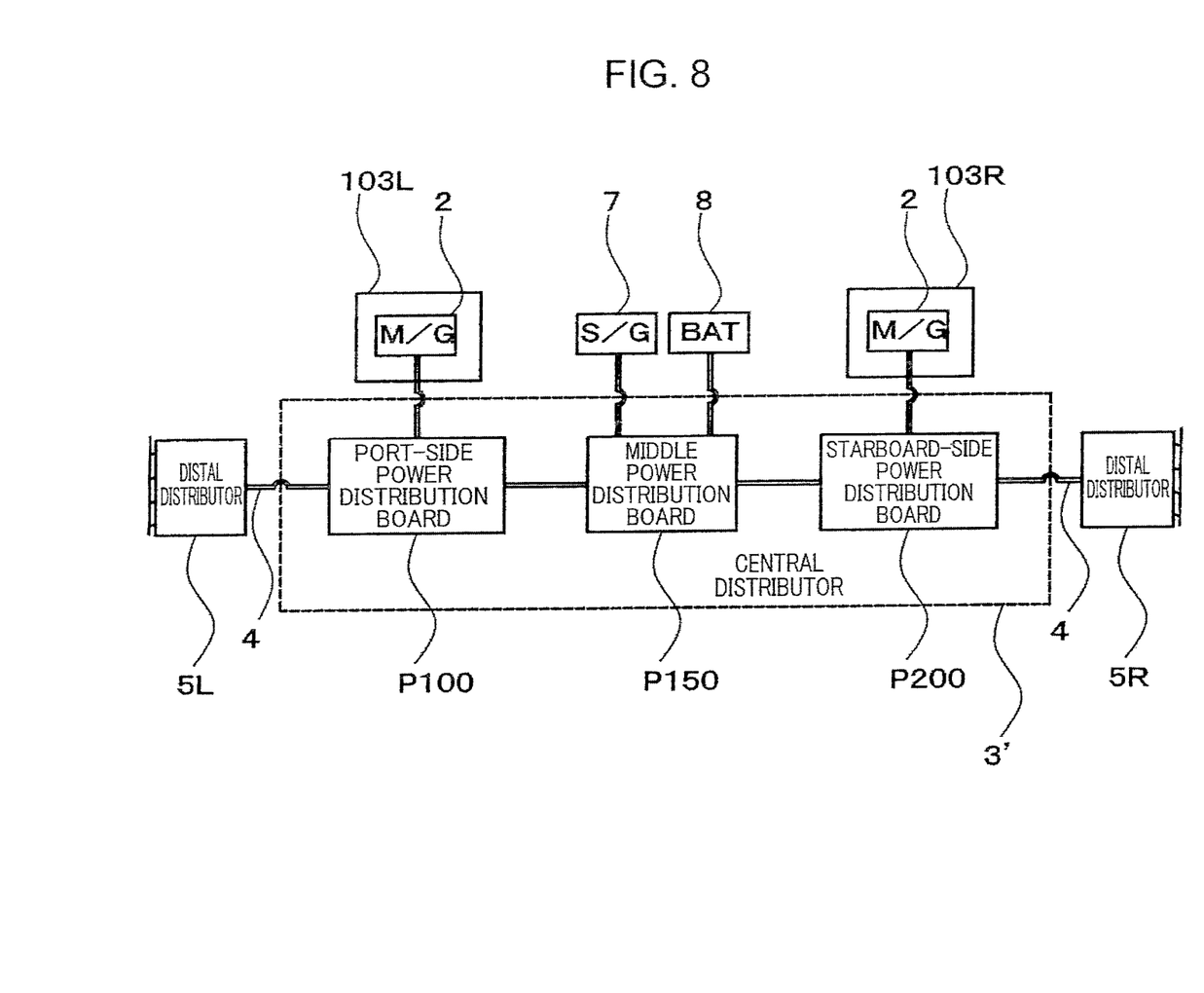
FIG. 8 is a diagram showing yet another modification of the first embodiment.

(10) In the aforementioned embodiment, the central distributor 3 is formed by using one power distribution board. Alternatively, as shown in FIG. 8, a central distributor 3' may be used instead of the central distributor 3, the central distributor 3' having three power distribution boards P100, P150, P200.

The central distributor 3' has a port-side power distribution board P100, a middle power distribution board P150 and a starboard-side power distribution board P200. The central distributor 3' may be regarded as a group of central distributors including these three power distribution boards P100, P150, P200.

The port-side power distribution board P100 is connected to the port-side distal distributor 5L by using one or more (in the present modification, two) first power source wires 4. The port-side power distribution board P100 receives power from the primary power generator 2 which is operated by the port engine 103L.

The middle power distribution board P150 is connected to the secondary power generator 7 and the main battery 8. The middle power distribution board P150 receives power supply from the secondary power generator 7 and the main battery 8. The middle power distribution board P150 is connected to the port-side power distribution board P100 and the starboard-side power distribution board P200 by the power source wires.

The starboard-side power distribution board P200 is connected to the starboard-side distal distributor 5R by one or more (in the present modification, two) first power source wires 4. The starboard-side power distribution board P200 receives power from the primary power generator 2 which is operated by the starboard engine 103R.

According to the aforementioned configuration, power is supplied from the port-side primary power generator 2 to the port-side distal distributor 5L via the port-side power distribution board P100. Power is supplied from the starboard-side primary power generator 2 to the starboard-side distal distributor 5R via the starboard-side power distribution board P200. Power is transmitted from the secondary power generator 7 and the main battery 8 to the middle power distribution board P150, and is then supplied to the distal distributor 5L via the port-side power distribution board P100, and is also supplied to the distal distributor 5R via the starboard-side power distribution board P200.

For example, if faults in the port engine 103L stop electricity generation at the port-side primary power generator 2, power is supplied from the starboard-side primary power generator 2 to the distal distributor 5L via the starboard-side power distribution board P200, the middle power distribution board P150 and the port-side power distribution board P100. Likewise, for example, if faults in the starboard engine 103R stop electricity generation at the starboard-side primary power generator 2, power is supplied from the port-side primary power generator 2 to the distal distributor 5R via the port-side power distribution board P100, the middle power distribution board P150 and the starboard-side power distribution board P200.

The central distributor is not limited to the aforementioned configuration of the central distributors 3 and 3', and may be configured by using two or four or more power distribution boards.

(11) In the aforementioned embodiment, DC power is supplied from the central distributor 3 to the distal distributors 5. Alternatively, AC power may be supplied from the central distributor 3 to the distal distributors 5. In this case, for example, the AC power is converted to DC power in the distal distributors 5 or alike.

(12) In the aforementioned embodiment, distal distributors 5 are arranged in the main wings 102R, 102L. Alternatively, the distal distributors 5 may be situated in the fuselage 104 or the tail. The central distributor 3 may be situated in the main wings 102R, 102L or the tail.

(13) In the aforementioned embodiment, ailerons and spoilers are used as steering surfaces which are operated by electric actuators. Alternatively, the principles of the aforementioned embodiment may be applied to other steering surfaces such as the elevators, rudders, flaps and so on. The principles of the aforementioned embodiment may be applied to electric actuators which drive the legs of the landing gear or alike as devices which are situated in the aircraft.

The various technologies described in the context of the aforementioned various embodiments mainly include the following features.

(1) The distribution system described in the context of the aforementioned embodiments includes: a central distributor to which power is supplied from a power generator of an aircraft; and a distal distributor which is away from the central distributor in the aircraft so that the power is supplied from the central distributor, the distal distributor distributing the supplied power to electrical devices situated in the aircraft.

According to this configuration, the distal distributor is away from the central distributor in the aircraft. Power is supplied from the distal distributor via wires or alike to electrical devices. Consequently, with regard to at least a part of the electrical devices situated in the aircraft, wires extending from the electrical devices do not have to be extended directly to the central distributor. Accordingly, there is a short total length of the wires in the aircraft. In short, the distribution system may achieve a reduced weight ratio of the wires to the aircraft.

(2) Preferably, the central distributor and the distal distributor are connected electrically by using at least one wire.

According to this configuration, when the central distributor and the distal distributor are connected by one wire, there is a small weight ratio of the wire to the aircraft. If the central distributor and the distal distributor are connected by two or more wires, there may be very reliable power supply from the central distributor to the distal distributor even under failures in a connection or alike in a part of the wires.

(3) Preferably, the distal distributor is configured to receive DC power supply from the central distributor.

According to this configuration, there may be a short distance between the central distributor and the distal distributor, which are situated in the aircraft. Therefore, there may be small transmission loss in DC power supply from the central distributor to the distal distributor. With regard to power supply from the central distributor to the distal distributor, the power is supplied from the central distributor to the distal distributor directly as DC power, which is often used by electrical devices. Therefore, the distal distributor does not have to convert the power from the central distributor from AC to DC. Consequently, there is very efficient power usage in the distribution system due to reduced power loss. Since a converter is not required for conversion between AC and DC of the power supplied from the central distributor to the distal distributor, the distribution system may have a simplified configuration.

(4) Desirably, the distal distributor is configured to be electrically connectable to electric actuators as the electrical devices.

According to this configuration, the electric actuators require a large current to drive movable wings and alike. Therefore, the wires connected to the electric actuators become large in diameter. Consequently, the wires are likely to be heavy. Wire connection between the electric actuators and the distal distributor results in a shorter wire length. Accordingly, there is a reduced wire weight. Consequently, there is a decreased weight ratio of the wires to the aircraft.

(5) Preferably, the central distributor is situated in a fuselage of the aircraft. The distal distributor is situated in a wing of the aircraft.

According to this configuration, the central distributor may use short wires for power supply to electrical devices used in a passenger cabin of the fuselage or alike. The distal distributor may use short wires for power supply to electrical devices such as electric actuators in a wing, wing illuminators and alike. Accordingly, there is a reduced weight ratio of the wires to the aircraft.

The principles of the aforementioned embodiments may be applied broadly as a distribution system.

This application is based on Japanese Patent application No. 2013-229626 filed in Japan Patent Office on Nov. 5, 2013, the contents of which are hereby incorporated by reference.

Although the present invention has been fully described by way of example with reference to the accompanying drawings, it is to be understood that various changes and modifications will be apparent to those skilled in the art. Therefore, unless otherwise such changes and modifications depart from the scope of the present invention hereinafter defined, they should be construed as being included therein.

The invention claimed is:

1. A distribution system for use in an aircraft, comprising:
a central distributor provided in the aircraft and operatively connected with a power generator of an aircraft for receiving power from the power generator;
a plurality of electrical devices situated in the aircraft for performing predetermined operations, respectively;
a distal distributor provided at a location which is away from the central distributor;
a first power source wire connecting the central distributor to the distal distributor for supplying the received power to the distal distributor; and
a plurality of second power source wires connecting the distal distributor to the plurality of electrical devices for distributing the supplied power to the plurality of electrical devices, respectively,
wherein the distal distributor includes a primary monitoring controller for monitoring an operational state of each of the plurality of electrical devices,
wherein each of the plurality of electrical devices includes an electric actuator, and the distal distributor is configured to be electrically connectable to each of the electric actuators,
wherein the primary monitoring controller is configured to diagnose the operational state of each of the electric actuators, and
wherein the primary monitoring controller includes a health monitoring portion configured to diagnose the operational state of each of the electric actuators by comparing a power amount supplied from the distal distributor to the electric actuator and a mechanical output amount of the electric actuator.

2. The distribution system according to claim 1, wherein the distal distributor is configured to receive DC power supply from the central distributor.

3. The distribution system according to claim 1, wherein the central distributor is situated in a fuselage of the aircraft, and wherein the distal distributor is situated in a wing of the aircraft.

4. The distribution system according to claim 1, wherein each of the plurality of electrical devices includes a unit for generating regenerative power, and the distal distributor includes a storage battery configured to store the regenerative power generated by the electrical devices.

5. The distribution system according to claim 4, wherein the storage battery stores the power supplied from the central distributor.

6. The distribution system according to claim 1, wherein the distal distributor includes a lightning surge protector configured to prevent a lightning surge current from flowing to the central distributor.

7. The distribution system according to claim 1, wherein the operational state includes an efficiency of each electric actuator.

8. A distribution system for use in an aircraft, comprising:
a central distributor provided in the aircraft and operatively connected with a power generator of an aircraft for receiving power from the power generator;
a plurality of electrical devices situated in the aircraft for performing predetermined operations, respectively;
a distal distributor provided at a location which is away from the central distributor;
a first power source wire connecting the central distributor to the distal distributor for supplying the received power to the distal distributor; and
a plurality of second power source wires connecting the distal distributor to the plurality of electrical devices for distributing the supplied power to the plurality of electrical devices, respectively,
wherein the distal distributor includes a primary monitoring controller for monitoring an operational state of each of the plurality of electrical devices, wherein each of the plurality of electrical devices further includes a secondary monitoring controller connected with the primary monitoring controller, the secondary monitoring controller configured to monitor an abnormality in the operation of each electrical device.

9. The distribution system according to claim 8, wherein the distal distributor is configured to receive DC power supply from the central distributor.

10. The distribution system according to claim 8, wherein the central distributor is situated in a fuselage of the aircraft, and wherein the distal distributor is situated in a wing of the aircraft.

11. The distribution system according to claim 8, wherein each of the plurality of electrical devices includes a unit for generating regenerative power, and the distal distributor includes a storage battery configured to store the regenerative power generated by the electrical devices.

12. The distribution system according to claim 11, wherein the storage battery stores the power supplied from the central distributor.

13. The distribution system according to claim 8, wherein the distal distributor includes a lightning surge protector configured to prevent a lightning surge current from flowing to the central distributor.

14. The distribution system according to claim 8, wherein the operational state includes an efficiency of each electric actuator.

* * * * *